United States Patent [19]
Okonski et al.

[11] Patent Number: 6,032,565
[45] Date of Patent: *Mar. 7, 2000

[54] MULTI-USE ROTARY DIE PLATE SYSTEM

[75] Inventors: Frank Okonski, Harwood Heights; Edward Porento, Sr., Des Plaines; Brian J. Bauer, Grayslake, all of Ill.

[73] Assignee: Best Cutting Die Company, Skokie, Ill.

[ * ] Notice: This patent is subject to a terminal disclaimer.

[21] Appl. No.: 08/876,875

[22] Filed: Jun. 16, 1997

Related U.S. Application Data

[62] Division of application No. 08/243,958, May 17, 1994, Pat. No. 5,697,277.

[51] Int. Cl.⁷ .............................. B23D 25/12; B26D 7/26; B26F 1/44

[52] U.S. Cl. ...................................... 83/522.15; 83/522.11; 83/663; 83/698.21; 83/698.51; 492/8; 492/31

[58] Field of Search ............................... 83/343, 346, 347, 83/331, 522.11, 522.15, 696, 698.51, 698.21, 698.41, 698.42, 663; 492/8, 31, 32; 101/DIG. 36, 486; 33/614–671

[56] References Cited

U.S. PATENT DOCUMENTS

| | | |
|---|---|---|
| Re. 32,128 | 4/1986 | Blumle ........................ 271/94 |
| 642,220 | 1/1900 | Green . |
| 884,218 | 4/1908 | Schwarz et al. . |
| 1,168,767 | 1/1916 | Unruh . |
| 1,618,191 | 2/1927 | Hemberger . |
| 1,746,048 | 2/1930 | Novick . |
| 1,766,244 | 6/1930 | Cumfer . |
| 1,777,285 | 10/1930 | Adist . |
| 1,927,728 | 9/1933 | Wolff . |
| 2,055,295 | 9/1936 | Kessler ................................ 101/415.1 |
| 2,277,405 | 3/1942 | McKiernan ............................ 101/171 |
| 2,299,650 | 10/1942 | Parks, Jr. et al. ......................... 164/68 |
| 2,386,147 | 10/1945 | Sidebotham ............................ 164/22 |
| 2,791,276 | 5/1957 | Weller .................................... 164/206 |
| 2,837,025 | 6/1958 | Pechy .................................. 101/415.1 |
| 2,898,854 | 8/1959 | Crawford .............................. 101/415.1 |
| 3,008,366 | 11/1961 | Taylor, Jr. ................................. 83/346 |
| 3,032,152 | 5/1962 | Titsler ....................................... 189/36 |
| 3,106,121 | 10/1963 | Novick ..................................... 83/152 |
| 3,128,681 | 4/1964 | Miller ......................................... 93/58 |
| 3,172,321 | 3/1965 | Schrader .................................. 83/100 |
| 3,190,194 | 6/1965 | Kirby et al. ............................. 93/58.2 |
| 3,198,093 | 8/1965 | Kirby et al. ............................. 93/58.2 |
| 3,209,630 | 10/1965 | McCartan ................................ 83/100 |
| 3,244,335 | 4/1966 | Downie ...................................... 225/1 |
| 3,257,885 | 6/1966 | Hornung .................................. 83/346 |

(List continued on next page.)

FOREIGN PATENT DOCUMENTS

| | | |
|---|---|---|
| 743783 | 10/1966 | Canada . |
| 0 312 422 A1 | 10/1987 | European Pat. Off. . |
| 0 519 661 A1 | 12/1992 | European Pat. Off. . |
| 2435331 | 4/1980 | France . |
| 1016112 | 9/1957 | Germany . |
| 28 52 521 | 6/1979 | Germany . |
| 3544358 | 6/1987 | Germany . |
| 1235372 | 1/1971 | United Kingdom . |
| 1322090 | 5/1973 | United Kingdom . |
| 2133734 | 8/1984 | United Kingdom . |
| WO 83/04004 | 11/1983 | WIPO . |

*Primary Examiner*—Rinaldl I. Rada
*Assistant Examiner*—Boyer Ashley
*Attorney, Agent, or Firm*—Sitrick & Sitrick

[57] ABSTRACT

A multi-use die system is provided having a die holder with reference marks disposed circumferentially and radially along the longitudinal axis of the holder, and a multi-use die plate for magnetic affixation to the die holder which impresses a pattern onto a material blank. The die plate has straight and angular reference marks disposed thereon which are adapted to align with the radial and longitudinal reference marks on the die holder so as to properly align the die on the die holder at a predetermined position. In a straight rotary die system, the die is aligned such that the straight reference mark on the die is aligned with the respective corresponding radial and circumferential references on the die holder. In the angular rotary die system, the die is aligned such that the angular mark is aligned with the corresponding radial and circumferential references on the die holder.

30 Claims, 6 Drawing Sheets

U.S. PATENT DOCUMENTS

| | | | |
|---|---|---|---|
| 3,270,602 | 9/1966 | Kirby et al. | 83/102 |
| 3,289,513 | 12/1966 | Johnson et al. | 83/344 |
| 3,460,443 | 8/1969 | Sarka et al. | 93/58.2 |
| 3,522,754 | 8/1970 | Sauer . | |
| 3,523,474 | 8/1970 | Kinslow, Jr. | 83/40 |
| 3,527,127 | 9/1970 | Stovall | 83/23 |
| 3,530,794 | 9/1970 | Ritzerfeld | 101/216 |
| 3,533,355 | 10/1970 | Wall | 101/415.1 |
| 3,578,761 | 5/1971 | Sarka | 83/343 |
| 3,602,079 | 8/1971 | Carlson | 83/67 |
| 3,602,970 | 9/1971 | Smith | 29/118 |
| 3,618,438 | 11/1971 | Simson | 83/117 |
| 3,668,752 | 6/1972 | Clifton et al. | 29/124 |
| 3,670,646 | 6/1972 | Welch, Jr. | 101/382 MV |
| 3,709,077 | 1/1973 | Trogan et al. | 83/152 |
| 3,730,092 | 5/1973 | Pickard et al. | 101/415.1 |
| 3,744,384 | 7/1973 | Jarritt et al. | 83/346 X |
| 3,752,042 | 8/1973 | Castille | 83/346 X |
| 3,789,715 | 2/1974 | Schuchardt et al. | 83/663 |
| 3,797,351 | 3/1974 | Jones, Jr. | 83/698 |
| 3,805,657 | 4/1974 | Simpson | 76/107.8 X |
| 3,810,055 | 5/1974 | Wright | 335/285 |
| 3,823,633 | 7/1974 | Ross | 83/346 |
| 3,824,926 | 7/1974 | Fukuyama | 101/378 |
| 3,824,927 | 7/1974 | Pugh et al. | 101/378 |
| 3,850,059 | 11/1974 | Kang | 83/346 X |
| 3,886,825 | 6/1975 | Tanaka | 83/13 |
| 3,898,899 | 8/1975 | Weinstein | 83/29 |
| 3,965,786 | 6/1976 | D'Luhy | 83/346 |
| 3,975,976 | 8/1976 | Prentice | 83/556 |
| 3,977,283 | 8/1976 | Helm | 83/346 X |
| 4,004,479 | 1/1977 | Bodnar | 83/345 |
| 4,020,724 | 5/1977 | Quinlan | 83/346 |
| 4,127,265 | 11/1978 | Wirz et al. | 271/260 |
| 4,187,752 | 2/1980 | Chesnut | 83/663 |
| 4,191,076 | 3/1980 | Bollmer et al. | 83/13 |
| 4,226,150 | 10/1980 | Reed | 83/346 |
| 4,233,873 | 11/1980 | Jessen | 83/652 |
| 4,237,786 | 12/1980 | Sanford | 101/378 |
| 4,270,910 | 6/1981 | Himmelsbach | 493/373 |
| 4,289,492 | 9/1981 | Simpson | 493/371 |
| 4,402,265 | 9/1983 | Pickard | 101/382 MV |
| 4,450,740 | 5/1984 | Chapman, Jr. et al. | 83/303 |
| 4,537,588 | 8/1985 | Ehlscheid et al. | 493/342 |
| 4,549,454 | 10/1985 | Yamashita | 83/27 |
| 4,553,461 | 11/1985 | Belongia | 83/344 |
| 4,558,620 | 12/1985 | Wallis . | |
| 4,625,928 | 12/1986 | Peekna | 242/7.02 |
| 4,645,484 | 2/1987 | Niske | 493/362 |
| 4,671,152 | 6/1987 | Blümle | 83/152 |
| 4,676,161 | 6/1987 | Peekna | 101/378 |
| 4,726,804 | 2/1988 | Stitcher | 493/223 |
| 4,742,769 | 5/1988 | Zeller | 101/216 |
| 4,744,297 | 5/1988 | Sardella et al. | 101/382 MV |
| 4,770,078 | 9/1988 | Gautier | 83/344 |
| 4,809,609 | 3/1989 | Sugiura et al. | 101/426 |
| 4,823,659 | 4/1989 | Falasconi | 83/100 |
| 4,823,697 | 4/1989 | Randazzo | 101/375 |
| 4,831,930 | 5/1989 | Leanna | 101/389.1 |
| 4,842,485 | 6/1989 | Barber | 416/144 |
| 4,878,407 | 11/1989 | Harrison et al. | 83/13 |
| 4,920,630 | 5/1990 | Leanna | 29/521 |
| 4,920,843 | 5/1990 | Stromberg et al. | 83/346 |
| 4,982,639 | 1/1991 | Kirkpatrick | 83/659 |
| 5,003,854 | 4/1991 | Capdebosco | 83/331 |
| 5,005,816 | 4/1991 | Stemmler et al. | 270/39 |
| 5,074,180 | 12/1991 | Mayer et al. . | |
| 5,095,830 | 3/1992 | Love | 101/28 |
| 5,109,741 | 5/1992 | Fuchs | 83/100 |
| 5,119,707 | 6/1992 | Fischer | 83/698 |
| 5,138,923 | 8/1992 | Kent et al. | 83/665 |
| 5,186,108 | 2/1993 | Hillebrand | 101/415.1 |
| 5,211,096 | 5/1993 | Steidinger | 83/674 |
| 5,230,271 | 7/1993 | Hardisty et al. | 83/698 |
| 5,373,758 | 12/1994 | Gerhardt | 76/107.8 |
| 5,555,786 | 9/1996 | Fuller | 83/663 |
| 5,570,620 | 11/1996 | Okonski et al. | 83/152 |
| 5,697,277 | 12/1997 | Okonski et al. | 83/522.15 |

MULTI-USE ROTARY DIE PLATE SYSTEM

RELATED APPLICATIONS

This is a divisional application of application Ser. No. 08/243,958 filed May 17, 1994 now U.S. Pat. No. 5,697,277, issued Dec. 16, 1997.

FIELD OF THE INVENTION

The present invention relates generally to a system for properly aligning a die plate relative to a die holder.

BACKGROUND OF THE INVENTION

Impressing systems comprising die plates mounted on a die holder are utilized to process and finish predetermined patterns in sheet-like material typically found in web or blank form. Typical die plates include perforating plates, scoring plates, embossing plates, cutting plates and the like. The die plates may be magnetically attached to the die holder which brings the plate into successive contact with the web or blank which advance on a conveyor system. The die plate must be accurately positioned on the die holder at a predetermined position to accurately engage the web or blank.

U.S. Pat. No. 4,823,659 to Falasconi, for example, describes a specific embodiment of an impressing system comprising a conventional rotary panel cutting apparatus for cutting windows, notches, cavities, orifices or other patterns in relatively thin, flexible sheet-like material typically found in either sheet or web form. The cutting apparatus may be used to produce envelopes having a transparent panel or window for allowing visual inspection of the enclosure. The window envelopes are manufactured from a web of material or from previously cut blanks having a predetermined shape. A panel is subsequently cut from the blank to form the window. A transparent material may be added to cover the window. The bank may be gummed, folded, printed and packaged to form the finished envelope.

The cutting apparatus comprises a cutting tool in the form of a cutting plate or die which may be magnetically mounted on a rotary die holder which brings the cutting die into successive contact with the web and the blanks which advance on a conveyor system. The cutting die has a raised cutting surface which is adapted to engage the paper and cut a pattern in the material. The die holder, sometimes called a die cylinder or drum, is mounted for rotation on a drive shaft synchronized with the conveyor system so that the cutting die engages a different blank for each rotation of the die holder at a specific predetermined location.

In the impression system, the die plate must be accurately aligned and positioned at a predetermined position along both the radial and circumferential axis of the die holder in order to insure that the die plate accurately and repeatedly engages the web blank. In order to position the die plate on the die holder in conventional systems, the leading edge of the die plate is typically disposed along a single leading edge reference mark disposed on the die holder.

Rotary impression system apparatus typically utilize one of a "straight" or an "angular" alignment system. Envelope rotary cutting apparatus, for example, include the "angular" based rotary cutting die systems made by F. L. Smithe Company™ and the like and "straight" based cutting die system made by Winkler and Dunibier Company™ and the like. In the straight system, when the leading edge of the cutting die is positioned along the die holder leading edge, the leading cutting surface of the cutting die is typically parallel to or horizontally aligned with the longitudinal axis of the die holder and a zero degree angle is formed relative to the longitudinal axis of the die holder. In contrast, in angular systems, when the leading edge of the cutting die is positioned along the die holder leading edge, the leading cutting surface of the cutting die is angularly aligned relative to the longitudinal axis of the holder. Different cutting systems will have different angular orientations, typically from about 0 to about 15° in either direction, and preferably at a 1½ degree.

Operators are thus required to maintain separate dies for each of the straight and the angular systems. An operator making a certain pattern will thus require two separate die plates when the impression operation is performed on both the angular and the straight systems. This has resulted in a relatively expensive duplication of inventory of die plates.

OBJECTS AND SUMMARY OF THE INVENTION

It is an object of the invention to provide an improved impression tool for impressing patterns in sheet-like material.

Another object of the invention is to provide an improved impression tool which functions in an efficient manner, is easily assembled, and is adapted for operation with different die plate systems.

It is a related object of the invention to provide an impression tool which permits the die plate to be easily and accurately positioned on the die plate holder.

It is also an object of the present invention to provide a die plate which may be utilized with either straight or angular based impression systems.

It is a specific object of the invention to provide an improved cutting tool for cutting patterns in sheet-like material.

Another object of the invention is to provide an improved cutting tool which functions in an efficient manner, is easily assembled, and is adapted for operation with different cutting dies systems.

It is a related object of the invention to provide a cutting tool which permits the cutting die to be easily and accurately positioned on the die holder.

It is also an object of the present invention to provide a cutting die which may be utilized in either straight or angular based cutting systems.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
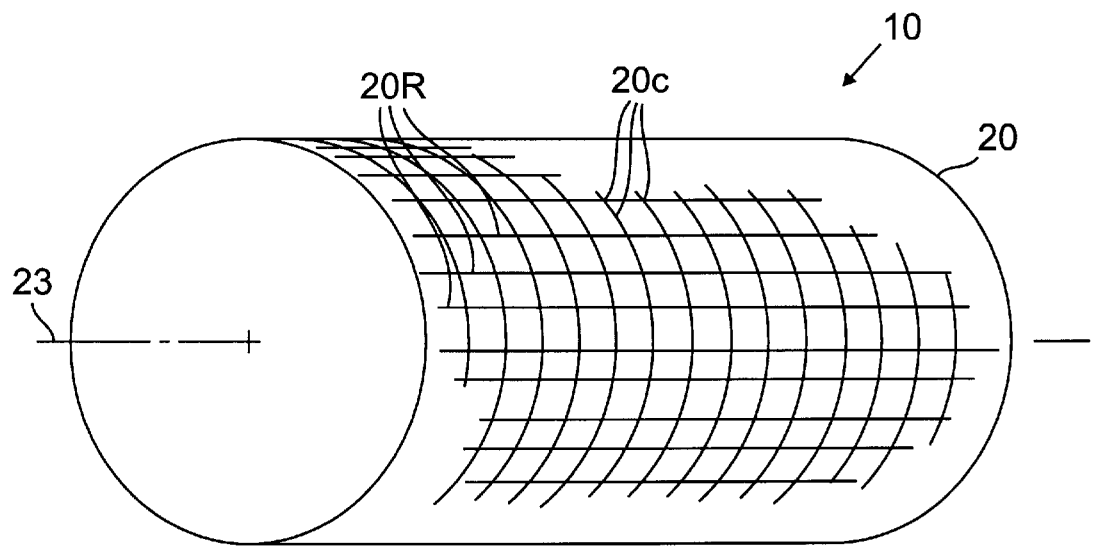
FIG. 1 is a perspective view of a die holder having radial and circumferential reference marks in accordance with one embodiment of the present invention.
Figure 2:
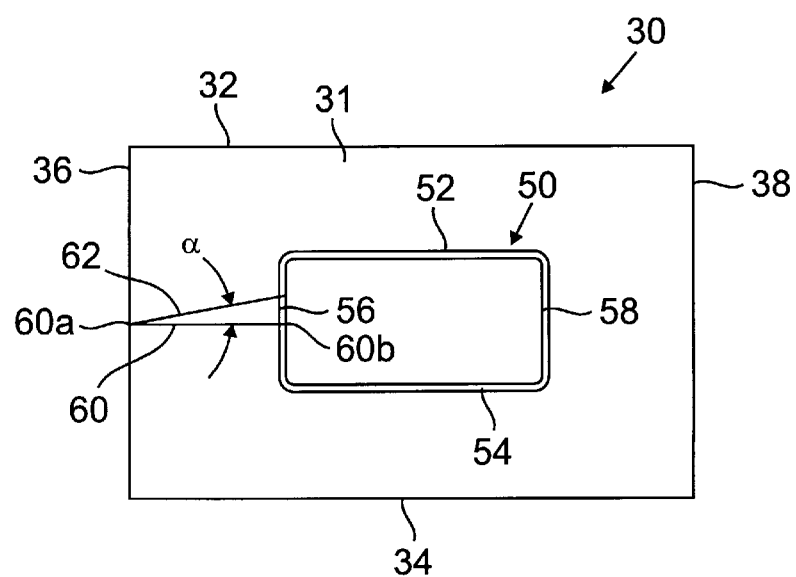
FIG. 2 is a plan view of a die having straight and angular reference marks in accordance with one embodiment of the present invention.
Figure 3:
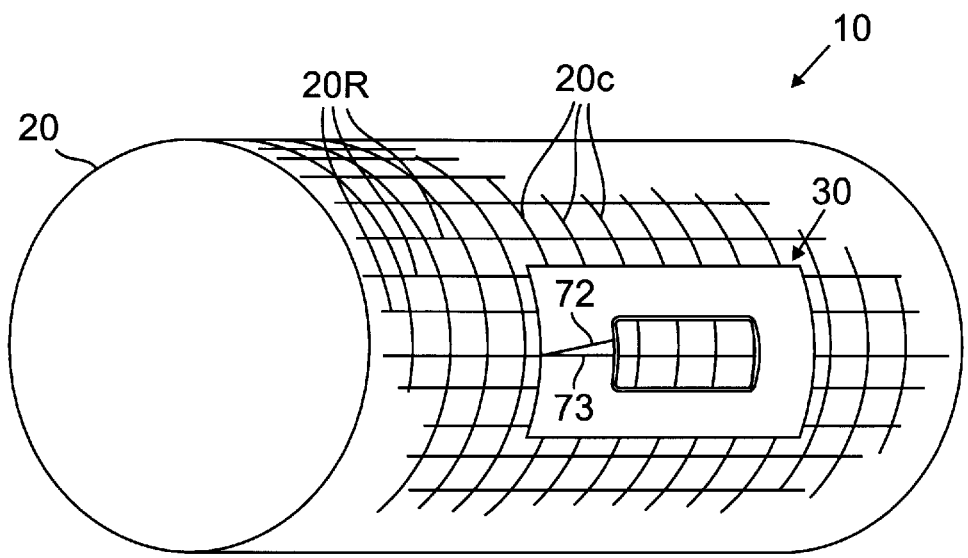
FIG. 3 is a perspective view illustrating the die of FIG. 2 disposed on the die holder of FIG. 1 with the straight reference mark of the die aligned with the radial reference mark of the die holder.

Referring to the drawings and more particularly to FIGS. 1–3, one embodiment of a multi-use impression system 10 is provided in accordance with the present invention for forming patterns in and/or cutting sheet-like work-piece material such as paper and the like. The system 10 comprises a die holder 20 adapted for magnetically retaining a die plate 30 in selected positions around its outer surface 18 as generally shown in FIG. 3.

Referring to FIG. 1, the die holder 20 has a cylindrical shape and is mounted for rotation so that the die plate 30 engages a different material blank for each rotation of the die holder 20. The die holder 20 has a longitudinal axis 23 generally extending along the axis of the drive shaft 12. Conventional die holders will have a leading edge reference mark 11 indicating where the leading edge of the die plate 30 is to be aligned as shown for example in FIGS. 7 and 10.

Typical impression or die plates 30 comprise inter alia perforating plates for cutting perforation slots in the material, scoring plates for forming grooves in the material, embossing plates for pressing one side of a material to form a raised pattern or impression on the opposing side of the material, and cutting plates for cutting a pattern in the material. Although the invention is described using a cutting plate in the following embodiments, it will be appreciated that the invention is adaptable to any impression plate.

Figure 8:
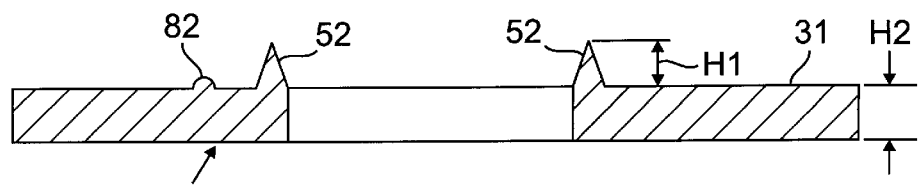
FIG. 8 is a cross section of the die taken along line 8—8 in FIG. 7.

The die plate 30 is a flexible sheet of metal which, as shown in FIG. 2, has a leading edge 32, a trailing edge 34 and opposing side edges 36, 38 for selectively and releasably attaching to the die holder 20. The die plate 30 has a flat or a slightly curved first surface 31 and a raised pattern second surface 50 having a contour corresponding to the outline of the pattern to be formed in the material blank or web. In the illustrated embodiment, the pattern surface 50 has a rectangular contour to cut a rectangular window panel from an envelope blank defined by a leading pattern surface 52, a trailing pattern surface 54, and opposing side pattern surfaces 56, 58. It will be appreciated that the pattern surface 50 may also have other appropriate shapes and patterns known to those skilled in the art including, for example, a pattern surface adapted to cut the sides of an envelope blank. The die plate 30 may be manufactured from any suitable flexible magnetic material including, for example, stainless steel, carbon steel or the like. Referring to FIG. 8, the thickness H2 of a cutting die 30 at the pattern surface 50 will typically be from about 0.003–0.033 inches and the thickness H1 of the plate at surface 31 will typically be from about 0.003–0.060 inches, but may vary depending upon the application. Other types of impression plates may have different dimensions depending upon the application.

In accordance with certain objectives of the invention, the system 10 has an alignment means for accurately aligning the die plate 30 on the die holder 20 at predetermined angular orientations either in straight-based or angular-based systems and for accurately positioning the die plate at predetermined radial and circumferential positions on the die holder.

In one embodiment of the invention, the alignment means comprises the die holder 20 (shown in FIGS. 1, 3–4) having a plurality of radial reference markings 20r and circumferential reference markings 20c disposed on the exterior surface which run radially and circumferentially, respectively, relative to longitudinal axis 23. The radial and circumferential markings 20r, 20c provide positional reference points for accurate radial and circumferential positioning of the die plate 30 at predetermined locations so that the die may accurately and repeatedly form the pattern in the successive material blanks. In one embodiment, the radial and circumferential markings 20r, 20c are uniformly spaced, typically every ⅛ inch or as needed, about the entire surface of the die holder 20 to give the operator uniform reference points for accurate alignment of the die plate 30 at predetermined positions. It will be appreciated, however, that any number of radial or circumferential reference markings 20r, 20c may be used. Similarly, the radial and circumferential markings 20r, 20c may be placed anywhere on the surface of the die holder 20 such that the die plate 30 may be positioned at the predetermined position. It is preferred that the radial marks 20r be parallel to the longitudinal axis of the die holder 20 and that the circumferential marks 20c be perpendicular to the radial marks 20r for ease of manufacture.

The die plate 30 (shown in FIGS. 2–4) has at least first and second reference markers 60, 62 which are angularly disposed relative to each other and which cooperate with one or more of the die holder reference marks 20r, 20c to properly align the die plate 30 in the predetermined orientation relative to the longitudinal axis of the die holder 20 and to accurately position the die plate 30 at the predetermined radial and circumferential positions on the die holder 20.

Figure 4:
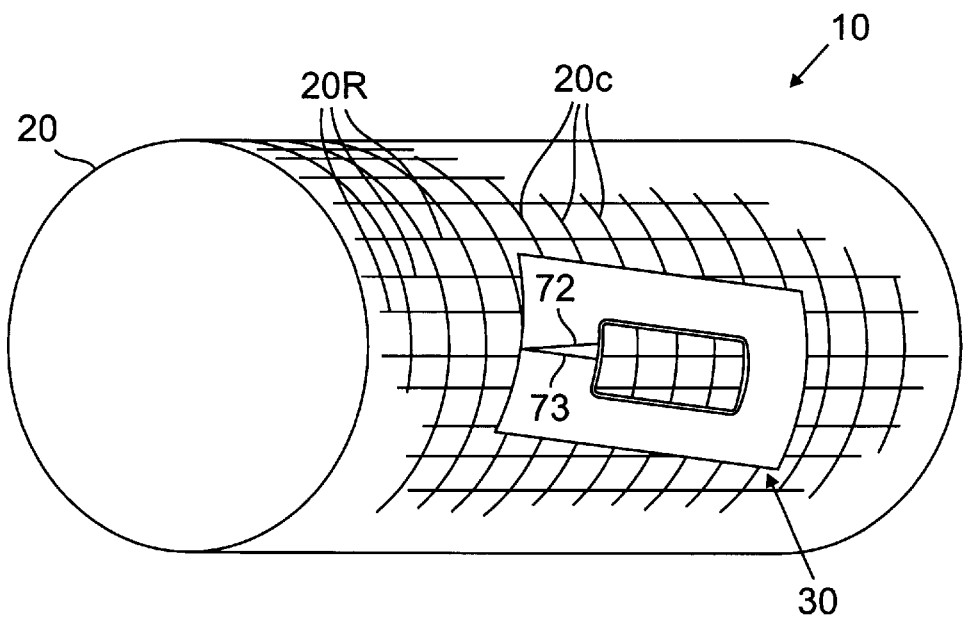
FIG. 4 is a perspective view illustrating the die of FIG. 2 disposed on the die holder of FIG. 1 with the angular reference mark of the die aligned with the radial reference mark of the die holder.

In the die plate 30 illustrated in FIG. 2, the first or "straight" reference mark 60 is adapted to cooperatively align with the one of the reference marks 20r, 20c on the die holder 20 so as to properly align the die plate 30 on the die holder 20 at a predetermined orientation for straight-based systems. In FIG. 3, the straight reference mark 60 is aligned with the radial mark 20r to orientate the leading pattern edge 52 parallel to the longitudinal axis 23. Similarly, the second or "angular" reference mark 62 is adapted to cooperatively align with one of the reference marks 20r, 20c on the die holder 20 so that the die plate 30 is properly aligned on the die holder 20 at a predetermined orientation and position for angular-based systems. In FIG. 4, the angular reference mark 62 is aligned with the radial mark 20r to angularly orientate the leading pattern edge 52 relative to the longitudinal axis 23 of the die holder 20. In other embodiments, the die reference marks 60, 62 may be aligned with one of the circumferential mark 20c on the die holder 20.

The angle α formed between the straight reference mark 60 and the angular reference mark 62 will depend on the particular system used by the operator. In cutting systems using cutting plates, for example, the angular-based systems typically require that the leading cutting surface 52 be angularly displaced about 1½ degrees relative to the longitudinal axis 23. Thus, referring to FIG. 2, the angle α between the marks 60 and 62 will typically be 1½ degrees to accommodate the F. L. Smith™ and Winkler and Dunibier™ cutting systems. It will be appreciated however that the angle α may be varied to accommodate any other systems so as to provide the desired angular alignment.

In cutting dies 30 having the illustrated rectangular cutting surface 50, the reference marks 60, 62 are disposed on the die plate 30 so that the leading cutting surface 52 is maintained parallel to the longitudinal axis 23 of the die holder 20. If the cutting surface 50 has an irregular shape, the center of the leading cutting surface 52 is typically the reference point for proper alignment on the die holder 20.

Figure 7:
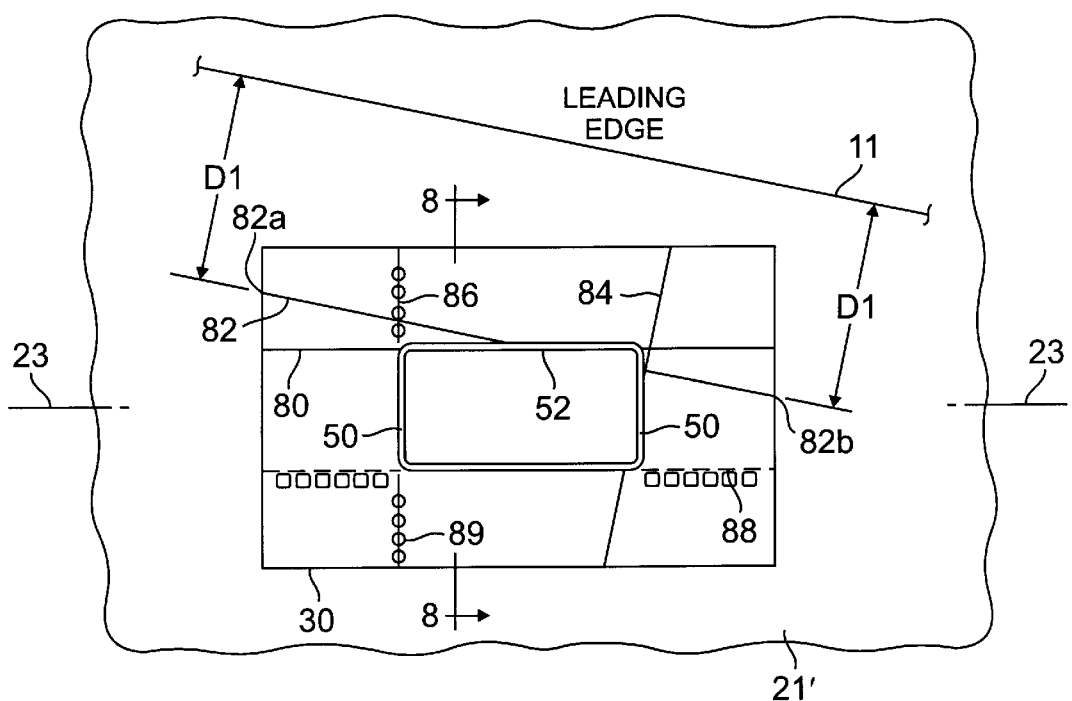
FIG. 7 is a plan view of an embodiment of the die illustrating reference marks extending from the center of the leading edge of the pattern surface.

The reference marks 60, 62 on the die 30 may be raised above the die surface 31 as shown in FIG. 8 (although not as high as the pattern surface 52), recessed below the surface 31, or even a slot or holes extending through the cutting die 30. As shown in FIG. 7, it may also be desirable to have the holes for one reference mark delineated as one shape 88 such as a square and the holes for the other reference mark delineated as another shape 89, such as a circle, to assist the operator in selecting and subsequently aligning the reference marks.

In order to accurately position and align the die plate 30 at a predetermined position and orientation on the die holder 20, each reference mark 60, 62 requires at least two points adapted to align the die plate 30 with the reference marks 20r, 20c on the die holder 20. The die reference markers 60, 62 may be of any desired length. Referring to FIGS. 2–4, it will be seen that the reference marks 60, 62 extend from the left side 36 of the die plate 30 up to the left pattern surface 56 but do not actually mar the pattern surface 50, effectively presenting two reference points 60a, 60b. The two reference points 60a, 60b permit alignment of the die reference mark 60 and one of the die holder reference marks 20r, 20c.

Figure 5:
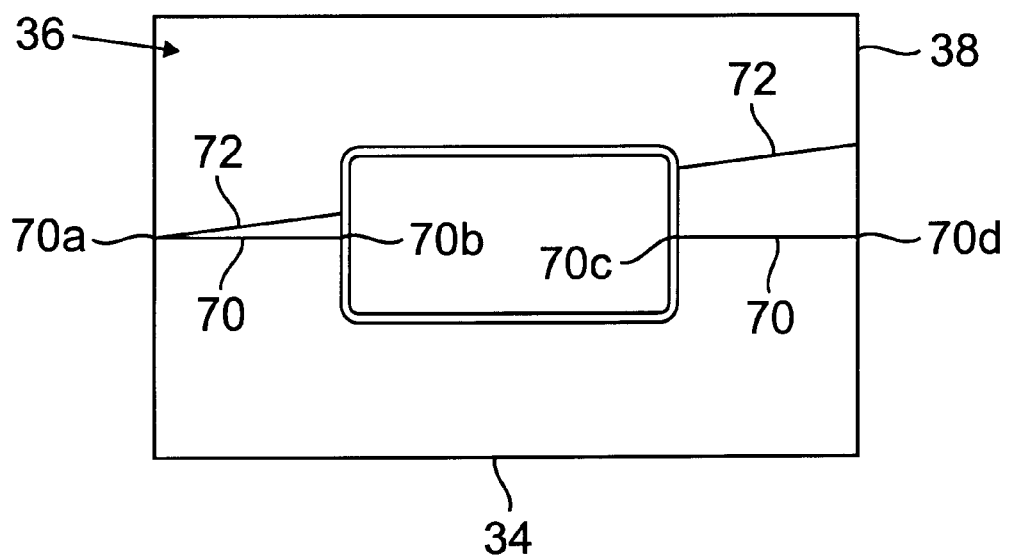
FIG. 5 is a plan view of another embodiment of the die illustrating the reference marks extending between the sides of the die.

In the embodiment illustrated in FIG. 5, the reference marks 70, 72 extend from the left side 36 to the right side 38 of the die plate 30 and passes by, without marring, the pattern surface 50, thereby presenting four reference points 70a, 70b, 70c, 70d for easier alignment and positioning of the die plate 30.

Figure 6:
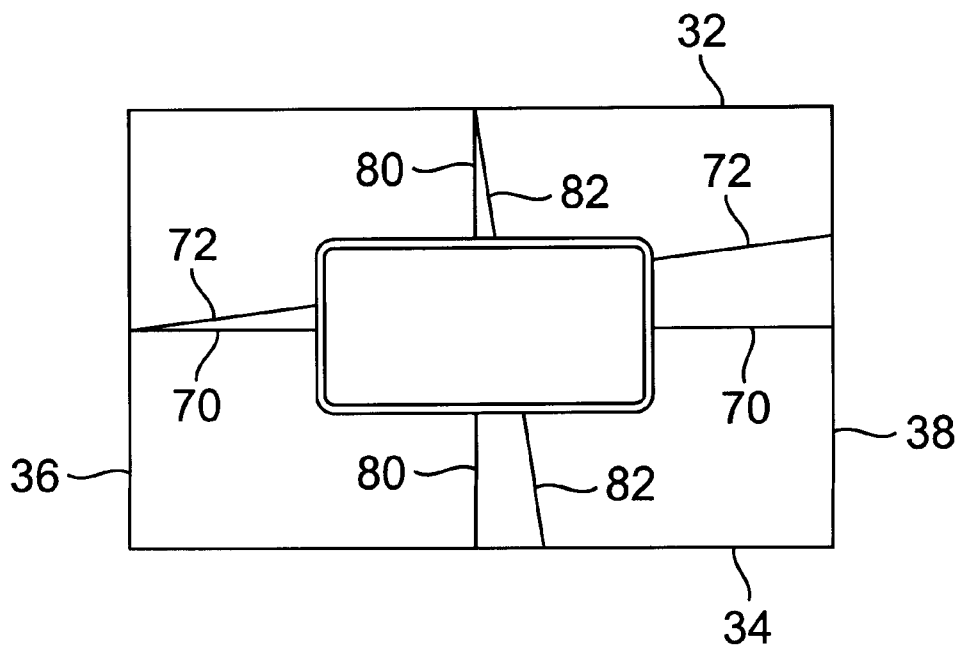
FIG. 6 is a plan view of an embodiment of the die illustrating reference marks extending between the top and bottom edges and the side of the die.

In the embodiment illustrated in FIG. 6, the reference marks 80, 82 are disposed adjacent the leading and/or trailing ends 32, 34 of the die plate 30 which permit the die plate 30 to be aligned and positioned relative to the circumferential reference marks 20c on the die holder 20. The presence of the reference marks 80, 82 at the leading/trailing ends 32, 34 and the reference marks 70, 72 at the sides 36, 38 permit the die plate 30 to be accurately positioned in any predetermined radial and circumferential position, respectively, on the die holder 20. Thus, unlike conventional systems which require a relatively large die which spans the distance from the leading pattern edge 52 to the die holder leading edge reference mark 11, the present invention permits the die to be relatively smaller, more compact, and less expensive to manufacture. Thus, a plurality of the dies 30 may be disposed on the die holder 20. It will also be appreciated that the corresponding straight reference marks 70 and 80 and the corresponding angular reference marks 72 and 82 are perpendicular to each other.

The die plate 30 may also be utilized with conventional die holders 21 generally illustrated in FIG. 7 which have a leading edge reference mark 11 generally illustrated in FIG. 7, but not radial and circumferential reference marks as shown in FIGS. 1 and 3–4. In this embodiment, the alignment means comprises the die 30 having a straight reference mark 80 adapted to properly orientate the die in straight-based systems and an angular reference mark 82 adapted to orientate the die in angular-based systems. In FIG. 7, the leading edge reference mark 11 is angularly orientated relative to the longitudinal axis 23 of the die holder 21. The die plate 30 is placed on the die holder 21 so that the angular reference mark 82 is equidistant (D1) from the die holder leading edge 11 so that the reference mark 82 and the die holder leading edge 11 are parallel to each other. In the illustrated embodiment, the reference marks 80, 82 pass by without marring the center of the leading edge of the pattern. In FIG. 7, the endpoints of the reference marks 82a, 82b make convenient reference points for measuring distance D1. In FIG. 7, it will be appreciated that the reference marks 80 and 82 pass by the center of the leading pattern surface 52. Reference marks 84, 86, 88 may also be disposed by the side pattern surfaces 56 or the trailing pattern surface 54.

Figure 9:
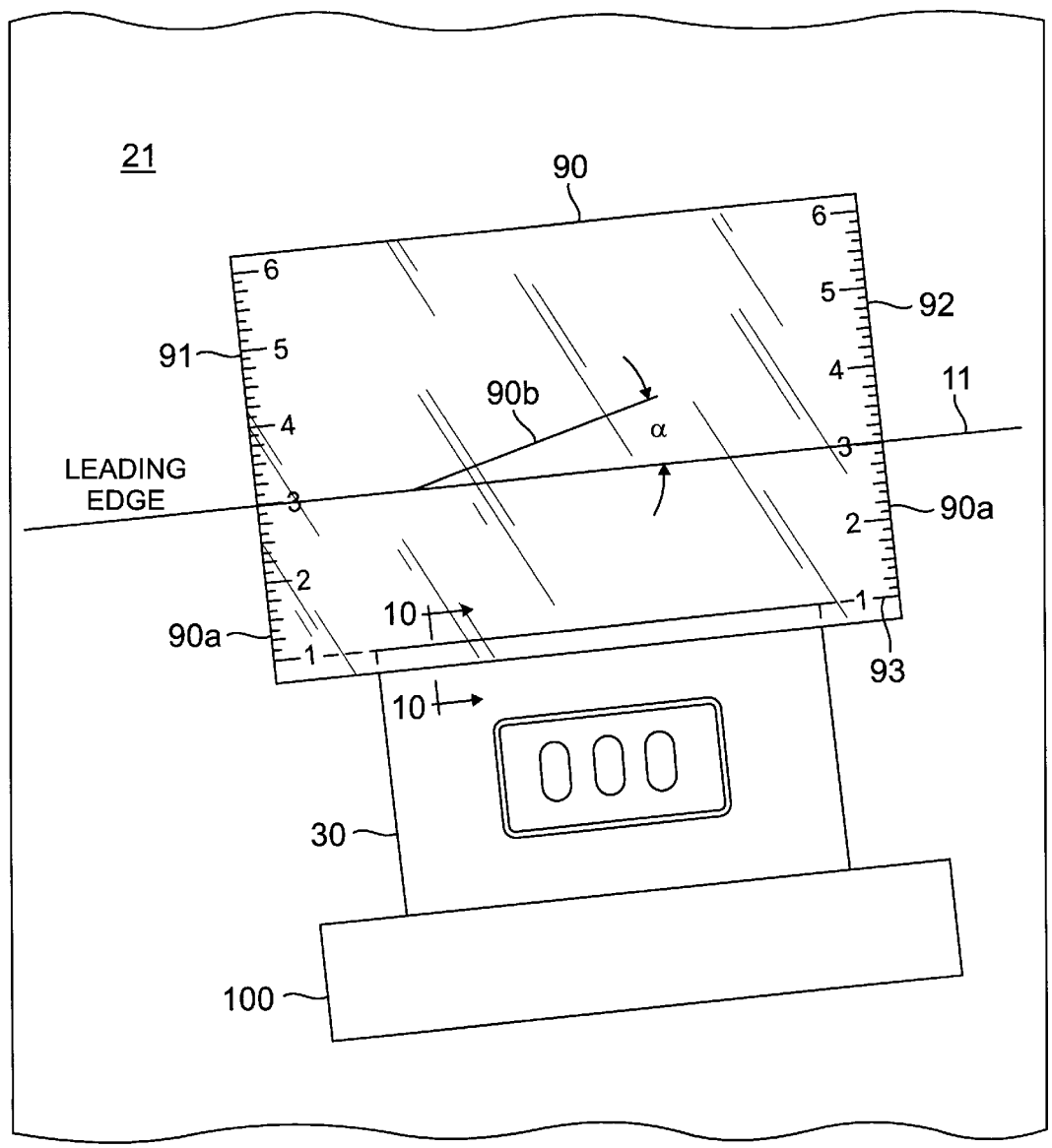
FIG. 9 is a plan view of a template for aligning the die at predetermined orientation and position on a die holder and a holding plate.
Figure 10:
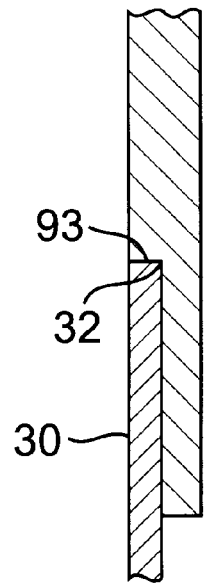
FIG. 10 is a cross section view of the template and the die taken along line 10—10 in FIG. 9.

In another embodiment, the alignment means comprises a template 90 having reference marks and a trailing edge 93. In the embodiment illustrated in FIGS. 9–10, the template 90 comprises straight reference marks 90a disposed along opposing sides 91, 92 and at least one angular reference mark 90b which are adapted to be aligned with the leading reference edge 11 of the die holder 21. In the illustrated embodiment, the straight reference marks 90a also form a ruler. The trailing edge 93 provides a reference edge for the die plate 30. By aligning the reference marks (number 3 in the illustrated embodiment) with the leading edge 11 of the die holder 21, the trailing edge 93 is disposed at the proper angular orientation. Thus, when the leading edge 32 of the die plate 30 is in abutting engagement against the reference edge 93, the die plate 30 will also be orientated at the proper angular orientation. FIGS. 9–10 show one embodiment in which the trailing edge 93 is formed as an undercut edge in the template 90.

In accordance with certain objects of the invention, the system 10 may also have a holding plate 100 which is adapted to be placed adjacent to and in abutting relationship with the trailing edge 34 of the die plate 30 in order to provide additional securement of the die plate 30 and prevent the die plate 30 from sliding on the die holder 21 during rotation. The holding plate 100 has a flat, rectangular surface 101 which is disposed below the level of the pattern edge 50 of the die plate 30. The holding plate 100 is preferably manufactured from a material which is magnetically attracted to the magnetic holder 20 so as to be held thereto by magnetic attraction. This assists in preventing slippage and movement of the die plate 30 during the impressing operation.

Figure 11:
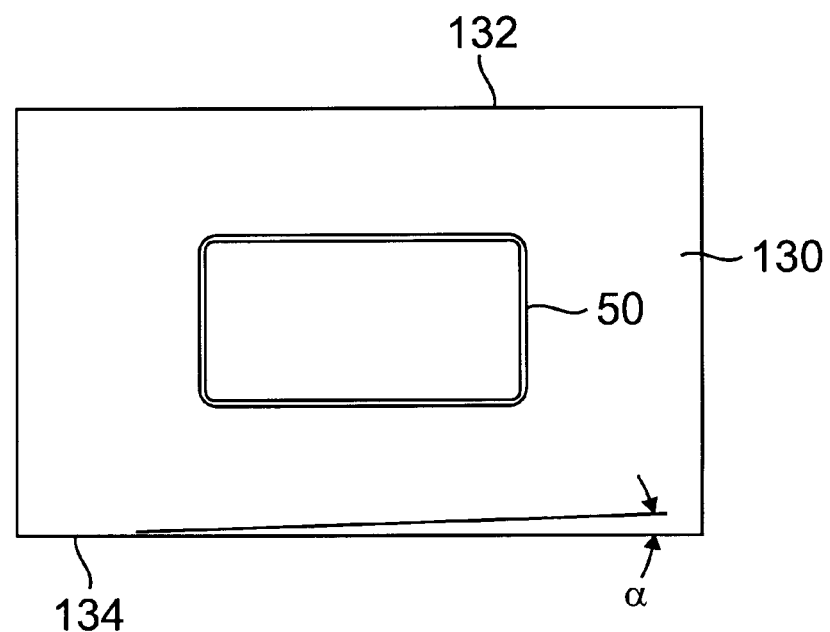
FIG. 11 is a plan view of another embodiment of a die having a straight leading end and an angularly-disposed trailing end.

Another embodiment of the alignment means is illustrated in FIG. 11. The die plate 130 has a straight reference mark delineated by the leading edge 132 and an angular reference mark delineated by the trailing edge 134. The trailing edge 134 forms an angle α relative to the leading edge 132. The reference marks 132, 134 may be aligned with the conventional die holder leading edge 11 shown in FIG. 7, the template 90 shown in FIG. 9 or the die holder reference marks 20*r*, 20*c* shown in FIG. 1.

Thus, it will be seen that a multi-use impression apparatus has been provided which attain the aforenoted objects. Although the structure and operation of the apparatus has been described in connection with the cutting of paper-like material, it is not intended that the invention be limited only to such operations. Various additional modifications of the described embodiments of the invention specifically illustrated and described herein will be apparent to those skilled in the art, particularly in light of the teachings of this invention. The invention may be utilized in the formation of any pattern in any thin and flexible sheet-like material, including, for example, paper, cloth or plastic materials to form envelopes, labels, sanitary napkins, window patterns and the like. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

What is claimed is:

1. A die plate for use in at least one of impressing, cutting, scoring, and embossing a web of workpiece material, said die plate providing for magnetic retention in a selected locatable position upon a cylindrical magnetic die holder having thereupon circumferential and radial reference marks extending relative to a longitudinal axis of said die holder, said die plate comprising:

(a) a thin flexible magnetically compatible material having a first surface defined by leading, trailing and two opposing side edges wherein at least one of the edges has a first alignment mark and a second alignment mark displaced by a predefined angle other than 90° relative to the first alignment mark such that said first and second reference marks are not parallel;

(b) a second impression surface raised above said first surface adapted to contact said workpiece material to perform at least one of impressing, cutting, scoring, and embossing said workpiece material, said impression surface having at least one of a leading impression surface and a side impression surface;

(c) wherein said die plate is aligned at a predetermined first angular orientation corresponding to alignment of the first alignment mark to a selected one of said reference marks on said magnetic die holder; and wherein said die plate is aligned at a predetermined second angular orientation corresponding to alignment of the second alignment mark to the same selected one of said reference marks on said magnetic die holder;

wherein at said first orientation at least one of said edges are aligned in a first position with the first alignment mark aligned relative to one of said circumferential and radial reference marks; and wherein at said second orientation at least one of said edges are aligned in a second position with the first alignment mark aligned relative to one of said circumferential and radial reference marks.

2. The die plate as set forth in claim 1, further comprising a holding plate adjacent to and abutting said die plate wherein said holding plate comprises a magnetically compatible material formed into a sheet, and coupled to said magnetic rotary die holder by magnetic adhesion.

3. The die plate as set forth in claim 1, wherein said impression surface comprises means for cutting a pattern in said material.

4. The die plate as set forth in claim 1, wherein said impression surface comprises means for perforating said material.

5. The die plate as set forth in claim 1, wherein said impression surface comprises means for embossing said material.

6. The die plate as set forth in claim 5, wherein said means for embossing comprises means for engaging a first side of said material to form a pattern on a second side of said material.

7. The die plate as set forth in claim 1, wherein said first and second alignment marks are for cooperatively aligning said die plate with at least one of said reference marks on said die holder such that said first alignment mark aligns said leading impression surface of said die plate at a first location parallel to said longitudinal axis of said die holder and said second alignment mark aligns said leading impression surface of said die plate at a second location at a predetermined angle relative to said longitudinal axis of said die holder.

8. The die plate as set forth in claim 7, further comprises a third alignment mark for cooperatively aligning said die plate with said reference marks on said die holder at one of said first and second orientations.

9. The die plate as set forth in claim 8, wherein each said alignment mark comprises a line extending from said at least one opposing side edge to a point adjacent one of said leading and said side impression surfaces thereby providing two endpoints adaptable for aligning said die plate relative to said die holder reference marks.

10. The die plate as set forth in claim 7, wherein said angle formed by said first and second alignment marks is between zero and about fifteen degrees.

11. The die plate as set forth in claim 10, wherein said angle formed by said first and second alignment marks is approximately 1.50 degrees.

12. The die plate as set forth in claim 7, wherein said alignment marks comprise a plurality of shapes for differentiating one said alignment mark from another said alignment mark.

13. The die plate as set forth in claim 12, wherein said plurality of shapes are comprised of apertures formed in said die plate.

14. A die plate capable of magnetic adhesion to a cylindrical magnetic die plate holder wherein said magnetic die plate holder has reference marks on an outer surface running circumferentially and radially relative to a longitudinal axis of said magnetic die plate holder, said die plate comprising:

a flexible thin sheet of magnetic material which provides for direct contact magnetic adhesion and retention of said die plate to said outer surface of said die plate holder, said sheet of magnetic material having a sheet surface defined by a leading edge, a trailing edge, and two opposing side edges;

an impression surface raised above said sheet surface, said impression surface comprising a leading impression surface;

said die plate further comprising first and second alignment marks on at least one of the edges of said die plate wherein said first and second alignment marks are angularly related by a predefined angle other than 90° when aligned relative to said reference marks at predetermined orientations thereto and wherein said first and second alignment marks are not parallel.

15. A die plate according to claim 14, wherein a first one of the predetermined orientations, corresponding to alignment of the first alignment mark with the respective associated reference mark, said leading impression surface is aligned at a first predefined angle relative to said longitudinal axis of said magnetic die plate holder; and wherein at another one of the predetermined orientations, corresponding to alignment of the first alignment mark with the respective associated reference mark, said leading impression surface is aligned at a second predefined angle relative to said longitudinal axis of said magnetic die pate holder.

16. A die plate as set forth in claim 14, wherein each alignment mark comprises a line extending from one of the side edges of the die plate to a point adjacent the impression surface thereby forming two endpoints capable of aligning the die plate relative to the die plate holder reference marks.

17. A die plate as set forth in claim 14, wherein each alignment mark comprises a line extending between two of the edges of the die plate forming at least two endpoints capable of aligning the die plate relative to the die plate holder reference marks.

18. A die plate as set forth in claim 14, wherein each alignment mark comprises a line extending between two edges of the die plate and past the impression surface forming at least four endpoints capable of aligning the die plate relative to the die plate holder reference marks.

19. A die plate as set forth in claim 14, wherein the first and second alignment marks each include a plurality of holes, said holes of said first alignment marks being of a different shape than the holes of said second alignment mark.

20. A die plate as set forth in claim 14, wherein the angle formed between the first and second alignment marks is from 0 and about 15 degrees.

21. A die plate as set forth in claim 14, wherein the angle formed between the first and second alignment marks is approximately 1½ degrees.

22. A die plate as set forth in claim 14, wherein the trailing and leading edges and one of the side edges each has corresponding first and second angularly related alignment marks to cooperatively align with corresponding one of the reference marks on the die plate holder such that the first alignment mark provides fob aligning the leading impression surface parallel to the longitudinal axis, and the second alignment mark provides for aligning the leading impression surface at a predetermined angle relative to the longitudinal axis.

23. A die plate as set forth in claim 22 wherein an angular displacement between the first and second alignment marks is identical for each one of said trailing and leading edges and the at least one of the side edges of said die plate.

24. A die plate as set forth in claim 14, wherein each alignment mark comprises a line extending from one of the trailing and leading edges of the die plate to a point adjacent the impression surface of said die plate forming two endpoints capable of aligning the die plate relative to the die plate holder reference marks.

25. A die plate as set forth in claim 24, comprises a template having opposing sides and a trailing end, said die plate holder adapted to have a leading edge reference mark, the sides having alignment marks adapted to cooperatively align with a leading edge reference mark, and the template trailing end having a predetermined angular orientation relative to the opposing sides such that the leading impression surface is aligned in a predetermined angular orientation relative to the leading edge reference mark when the leading edge of the die is abutted against the trailing edge of the template.

26. A die plate as set forth in claim 25, wherein the trailing end is perpendicular to the leading edge reference mark so that the leading impression surface is parallel to the leading edge reference mark.

27. A die plate as set forth in claim 25, wherein the trailing end is angularly displaced relative to the leading edge reference mark so that the leading impression surface is angularly displaced relative to the leading edge reference mark.

28. A die plate as set forth in claim 27, wherein the trailing end is angularly displaced relative to the leading edge reference mark by approximately 1½ degrees so that the leading impression surface is angularly displaced relative to the leading edge reference mark.

29. A die plate for impressing patterns in materials, said die plate capable of magnetic adhesion to a cylindrical magnetic rotary die holder, said magnetic rotary die holder comprising reference marks running circumferentially and radially relative to a longitudinal axis of said holder, at least one of said reference marks serving as a leading edge reference for said die plate, said die plate comprising:

a flexible magnetically compatible material formed into a sheet for the removable non-destructive and non-invasive positioning and adhesion of said die plate with said magnetic rotary die holder via the magnetic action of said rotary magnetic holder, said material formed into a sheet comprising a sheet surface defined by leading, trailing and opposing side edges;

an impression surface raised above said sheet surface for impressing a pattern with said material, said impression surface comprising at least one of a leading impression surface and a side impression surface;

said die plate further comprising an alignment means for selectively aligning said die plate at a predetermined orientation with said rotary magnetic holder, said alignment means comprising a template having opposing sides and a trailing end, at least one of said opposing sides having first and second alignment marks for cooperatively aligning said template with said leading edge reference of said magnetic rotary die holder wherein said first and second alignment marks are angularly related by a predefined angle other than 90° when aligned relative to said reference marks at predetermined orientations thereto and wherein said first and second alignment marks are not parallel; and said trailing end of said template capable of having an angular orientation relative to said opposing sides such that said leading impression surface is angularly oriented relative to said leading edge reference mark when said leading edge of said die abuts said trailing end of said template.

30. The die plate set forth in claim 29, wherein said trailing end of said template is angularly disposed relative to said leading edge reference mark of said magnetic rotary die holder such that said leading impression surface is angularly disposed relative to said leading edge reference mark.

* * * * *